(12) United States Patent
Korus (10) Patent No.: US 7,309,035 B2
(45) Date of Patent: Dec. 18, 2007

(54) IRRIGATION SYSTEM JOINT (75) Inventor: Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 201 days.

(21) Appl. No.: 11/168,578

(22) Filed: Jun. 28, 2005

(65) Prior Publication Data
US 2006/0289676 A1 Dec. 28, 2006

(51) Int. Cl.
B05B 3/00 (2006.01)
B05B 15/00 (2006.01)
F16L 55/00 (2006.01)

(52) U.S. Cl. ............ 239/730; 239/722; 239/723; 239/726; 239/728; 239/729; 239/743; 285/5; 285/111

(58) Field of Classification Search ........ 239/728–734, 239/177, 184, 178, 183, 172.2, DIG. 1; 285/5, 285/145.2–145.4, 373, 369, 370, 376
See application file for complete search history.

(56) References Cited

U.S. PATENT DOCUMENTS

| | | | | |
|---|---|---|---|---|
| 3,606,160 A | * | 9/1971 | Bonds et al. | 239/731 |
| 3,994,514 A | * | 11/1976 | Zimmerer et al. | 285/5 |
| 4,432,494 A | * | 2/1984 | Hunter | 239/729 |
| 4,434,936 A | * | 3/1984 | Chapman et al. | 239/731 |
| 4,508,269 A | | 4/1985 | Davis et al. | |
| 5,678,771 A | * | 10/1997 | Chapman | 239/727 |
| 5,695,129 A | * | 12/1997 | Korus | 239/729 |
| 5,947,393 A | | 9/1999 | Unruh | |
| 6,042,031 A | | 3/2000 | Christensen et al. | |
| 6,755,362 B2 | * | 6/2004 | Krieger et al. | 239/731 |

* cited by examiner

Primary Examiner—Kevin Shaver
Assistant Examiner—James S. Hogan
(74) Attorney, Agent, or Firm—Hovey Williams LLP (57) ABSTRACT A flow-through joint in an irrigation machine between the main pipeline section and a swing span, such as a corner span, permits a limited amount of generally linear displacement of the swing span within the joint for speed control or other purposes. A turret that rotates freely on the upright outlet port of the main pipeline section has a pair of coupling assemblies on opposite sides of the upright pivot axis through the outlet port, one of such coupling assemblies having a ball joint and the other being provided with relatively displaceable components. The arms of a connecting yoke on the inner end of the swing span are coupled with the ball joint on the one hand and the displaceable components on the other so as to provide the necessary swinging and pivoting motions while at the same time allowing displacing movement as necessary for control purposes. Opposing resilient cushions normally hold displacement components of the assembly in an equilibrium position but can be compressed to allow the displacing movement when the force exerted by the swing span exceeds a predetermined level. The small amount of displacing movement occurs about an upright axis through the ball joint on one side of the turret.

10 Claims, 7 Drawing Sheets

IRRIGATION SYSTEM JOINT

TECHNICAL FIELD

This invention relates to the field of agricultural irrigation systems. More particularly, it relates to an improved flow-through joint between the last span of the main pipeline section of such a system and a swing span thereof such as commonly used for watering corner portions of a field.

BACKGROUND

Irrigation systems such as center pivot irrigation machines frequently comprise a main pipeline section that is connected at its inner end to a fixed pivot where the water source is located, and a swing span that is connected to the outer end of the main pipeline section for watering corner portions of the field as the machine rotates about the central pivot. The main section typically comprises a number of pipeline spans supported by towers having non-steerable drive wheels that propel the system through the field. On the other hand, drive wheels on the tower of the swing span are usually steerable so as to permit the swing span to be steered along a particular path of travel during corner operations.

While watering a corner, the swing span swings through its arc at a different speed than the main section, and the correct speed for the swing span at any particular point in time depends upon the location of the swing span tower along its predetermined path of travel. In other words, the speed and location of the swing span tower must be closely coordinated with the speed of the main section, or else the swing span itself will undergo excessive compression or tension caused by relative movement, or attempted movement, between the main section and the swing span. The pivot joint between the swing span and the main section can also undergo excessive loading, leading to premature wear and failure.

It is known in the art to utilize such displacement of the swing span relative to the main section as a means for sensing the need to adjust the speed of the swing span. See for example U.S. Pat. No. 5,695,129 owned by the assignee of the present invention. See also prior U.S. Pat. Nos. 5,947,393 and 6,042,031 owned by Valmont Industries, Inc. wherein changes in the bowed configuration of the swing span, rather than linear displacement of the swing span, are sensed by a deflection sensor on the swing span to signal the need for a change in the speed of the swing span.

However, such prior speed control arrangements have not heretofore been available in a system having a "flow-through" joint wherein the water flow passage is coaxial with the joint pivot. Instead, such prior machines have typically utilized flexible hoses that by-pass the joint itself, leading from a point on the main section that is upstream from the pivot joint to a point on the swing span that is downstream from the pivot joint. Among other things, this has the disadvantage of limiting the maximum amount of rotation of the joint assembly because the flexible hosing that spans the joint has only a certain fixed length. Furthermore, the mere fact that an additional flexible hose is needed to transport the water around the joint presents a number of disadvantages.

The present invention provides a flow-through joint wherein the water inlet of the swing span and the water outlet of the main section are aligned vertically about the axis of joint rotation and which also permits a limited amount of displacement of the swing span relative to the main section for speed control or other purposes. It provides swing span displacement within the joint itself without sacrificing the flow-through nature of the joint or its range of motion in several directions. The permitted displacement is very slight, yet is of sufficient magnitude as to allow an appropriate control signal to be generated. The invention is particularly useful in machines wherein the drive motors for the swing span and main section are variable speed motors that operate continuously, as opposed to motors which stop and start periodically, although the invention has utility in those latter circumstances as well.

In a preferred form of the present invention, the flow-through joint has the upright, tubular inlet port of the swing span aligned axially with the upright, tubular outlet port of the main section and both disposed in concentric relationship with the upright axis of rotation of the joint. A turret is rotatably supported on the outlet port for free rotation about the joint axis. The inner end of the swing span is attached to the turret in such a way that the inlet port of the swing span remains in axial alignment with the outlet port of the main section in all rotary positions of the turret. At the same time, such connection permits a limited amount of generally linear or axial displacement of the swing span relative to the turret, which displacement can be utilized to carry out a control function such as speed control of the drive motors on the swing span. The connection between the swing span and the turret also permits a limited amount of up and down movement of the swing span relative to the main section without breaking the water-tight seal between the inlet and outlet ports at the joint.

In a preferred form of the invention, the turret has a pair of diametrically opposed coupling assemblies on opposite sides of the joint axis. A yoke on the inner end of the swing span has a pair of downturned arms that are coupled by the coupling assemblies to the turret. One of the coupling assemblies comprises a ball joint, while the other, opposite coupling assembly includes a component that is movable along a guide to a limited extent to permit displacement of the swing span. A pair of resilient but fairly hard cushions on opposite sides of the movable component prevent displacement unless the force applied thereto by the swing span exceeds a predetermined level, whereupon the movable component is allowed to move and mechanically operate a control arm that manipulates a rheostat, switch or the like in a control box. A flexible sleeve encompasses the inlet and outlet ports of the joint and maintains a fluid-tight seal at that location notwithstanding a slight horizontal twisting in the joint during displacement of the swing span and cocking or skewing of the ports during up and down movement of the swing span caused by changes in terrain.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
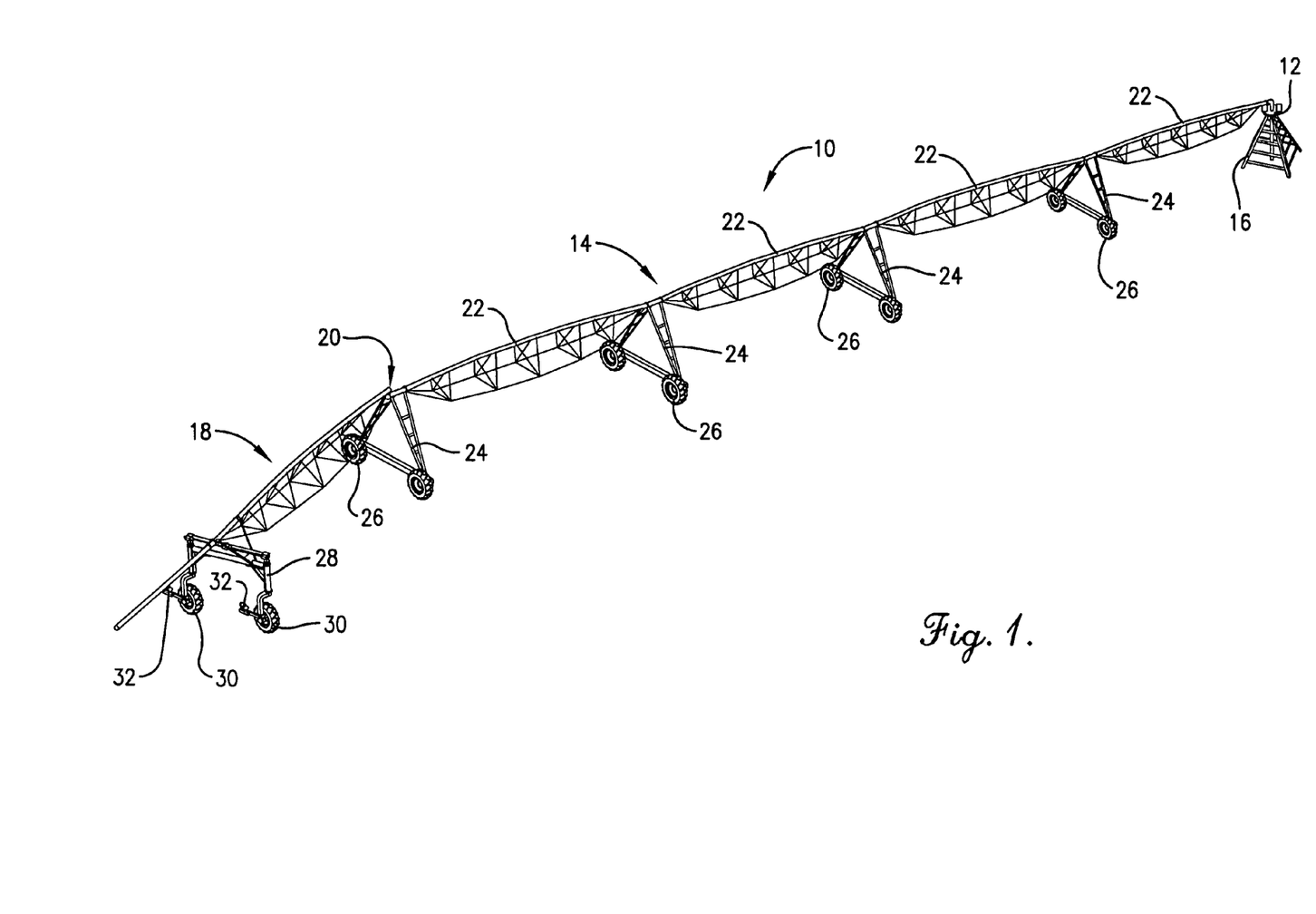
FIG. 1 is a schematic perspective view of a center pivot irrigation machine incorporating the principles of the present invention.
Figure 2:
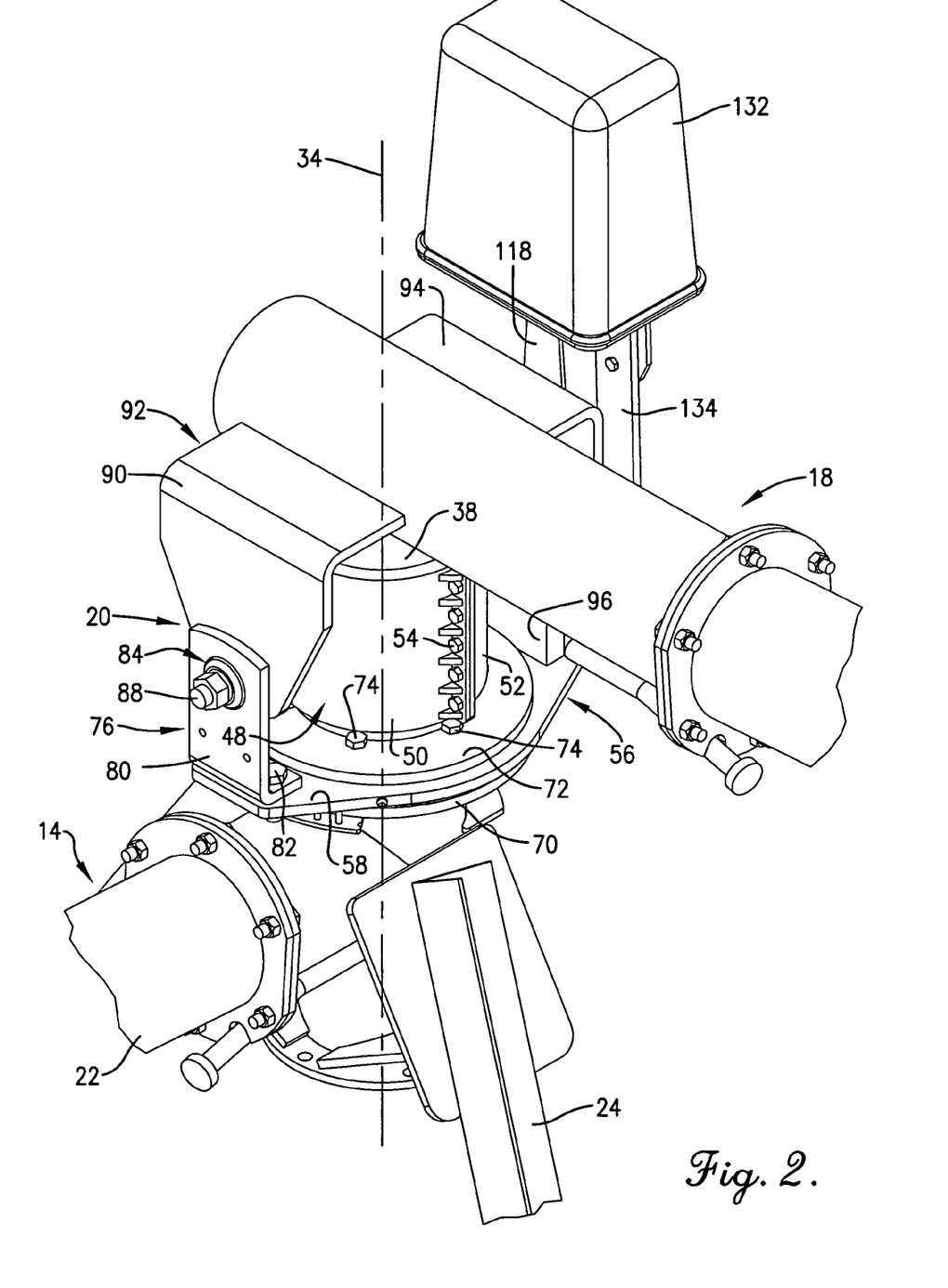
FIG. 2 is an enlarged, fragmentary isometric view of the flow-through joint between the swing span and the main section in accordance with the present invention.
Figure 3:
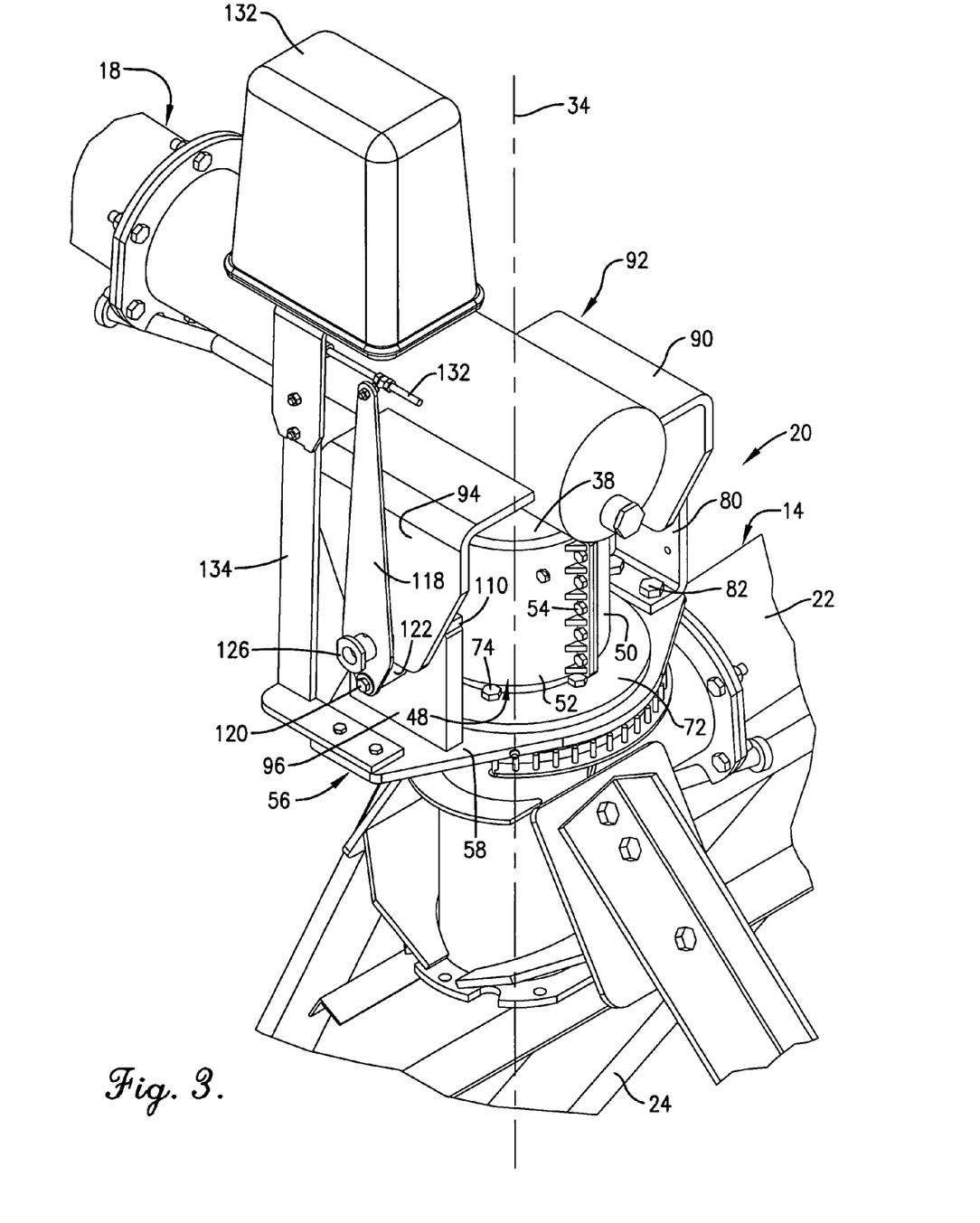
FIG. 3 is an enlarged, fragmentary isometric view of the joint taken from the opposite direction from FIG. 2.

The irrigation system 10 shown in FIG. 1 comprises a center pivot system having a fixed pivot 12 located at a well or other source of water. It will be appreciated that although the principles of the present invention are especially suited for a center pivot system, particularly one with a corner span as hereinafter described, such principles are not limited to a center pivot machine, nor to one wherein the swing span comprises a corner span. For the sake of simplicity and ease of understanding, the present invention will hereinafter be described in connection with a center pivot system having a swing span that comprises a corner span.

The irrigation system 10 as herein disclosed comprises a main pipeline section 14 connected at its inner end to the pivot 12 at a fixed tower 16, and a swing span in the nature of a corner span 18 pivotally connected to the outer end of main section 14. Corner span 18 is pivotally connected to main section 14 at a pivot joint 20. As is typical, main section 14 comprises a number of end-to-end main spans 22 that are supported by movable towers 24 having driven, non-steerable, ground-engaging wheels 26. Corner span 18 is supported by a movable tower 28 having steerable ground-engaging drive wheels 30. Preferably, wheels 26 and 30 are driven by continuously operating, variable speed motors such as the motors 32 associated with corner span 18. As well understood by those skilled in the art, corner span tower 28 is adapted to follow a predetermined path of travel, represented by a buried cable, for example, which is detected by means (not shown) on tower 28 for the purpose of steering the wheels 30 in the appropriate manner.

Referring to FIGS. 2-7, it will be seen that the joint 20 comprises a flow-through, in-line joint wherein water travels through the joint itself in a tubular passage that is concentric with the upright axis 34 of the joint. Joint 20 includes an upright, tubular outlet port 36 at the outer end of the last span 22 of main pipeline section 14, and an upright, tubular inlet port 38 projecting downwardly from the inner end of corner span 18. Ports 36 and 38 are axially aligned with one another and are spaced apart vertically to present a gap 40. A sleeve-like elastomeric tube or boot 42 surrounds ports 36, 38 and gap 40 so as to enclose gap 40 and provide water-tight, fluid flow communication between ports 36 and 38. The flexibility of boot 42 also, however, permits ports 36 and 38 to cant, skew or twist relative to one another without defeating the seal provided by boot 42. Internal sealing rings 44 and 46 within boot 42 help maintain sealing engagement between boot 42 and ports 36, 38, while a split coupler 48 in the nature of a rigid collar around the outside of boot 42 compresses the latter into tight sealing engagement with ports 36 and 38. Coupler 48 has a pair of semi-circular halves 50, 52 that are held together by bolts 54 so as to provide an adjustable amount of clamping force to boot 42.

Joint 20 further includes a turret 56 mounted on outlet port 36 for swiveling rotation about joint axis 34. Turret 56 includes a generally football-shaped base plate 58 having a centrally disposed hole 60 that receives outlet port 36 and is somewhat larger than the external diameter of port 36. A spacer ring 62 (FIGS. 5 and 6) occupies the annular space between base plate 58 and the outside of outlet port 36 created by hole 60, the spacer ring 62 having a circumferentially extending series of tubular feet 64 projecting downwardly from the bottom surface thereof. Base plate 58 rides on a pair of anti-friction rings 66 and 68 that are constructed from Nylon or some other suitable material having a relatively low coefficient of friction. Anti-friction rings 66, 68 circumscribe the feet 64 of spacer ring 62 and rest upon a flange 70 that is fixed to the exterior of outlet port 36 at a distance below the upper end thereof. A cap ring 72 sits on top of spacer ring 62 and also circumscribes outlet port 36. A series of upright bolts 74 pass through cap ring 72, spacer ring 62, feet 64 and flange 70 to firmly secure those components together in a relatively tight stack. The height of spacer ring 62 and feet 64 is slightly greater than the combined height of base plate 58 and anti-friction rings 66, 68 so that base plate 58 is free to rotate about outlet port 36 while cap ring 72, spacer ring 62, feet 64 and flange 70 remain stationary with outlet port 36.

Figure 4:
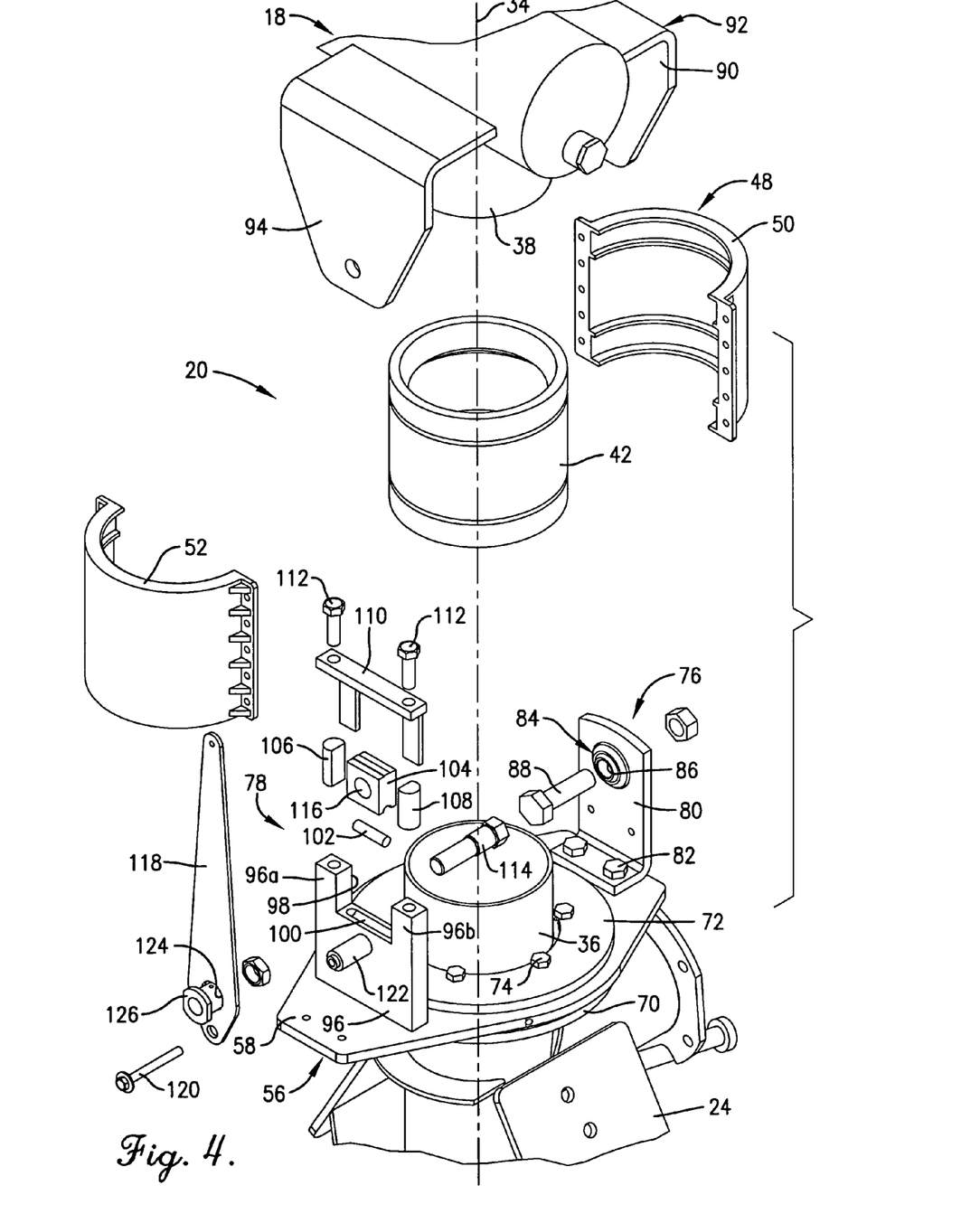
FIG. 4 is an exploded, fragmentary isometric view of the joint illustrating parts that comprise the joint.
Figure 5:
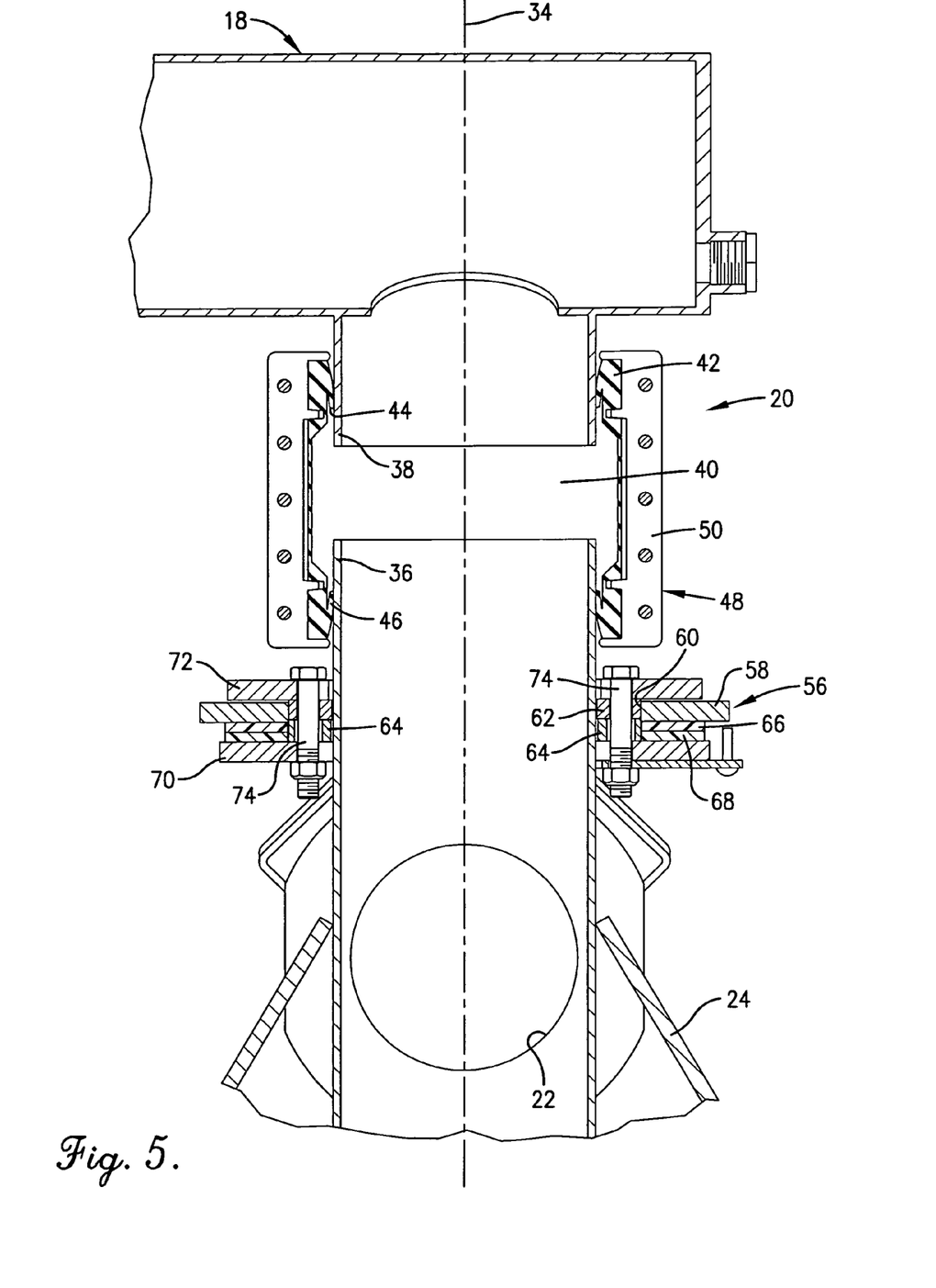
FIG. 5 is a fragmentary, vertical cross sectional view through the joint in a direction perpendicular to the longitudinal axis of the main section.
Figure 6:
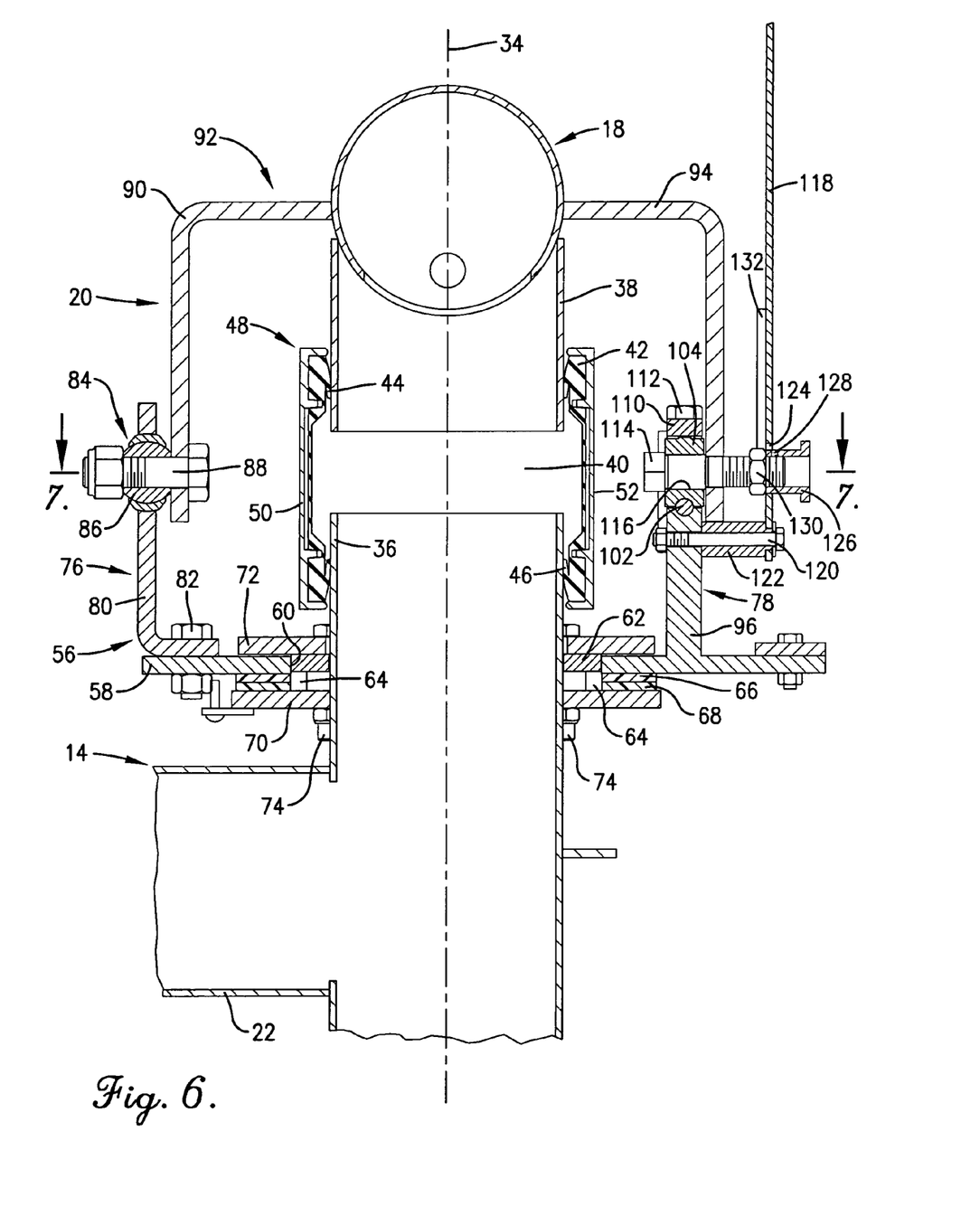
FIG. 6 is a fragmentary vertical cross sectional view through the joint at a 90° angle to the view in FIG. 5.
Figure 7:
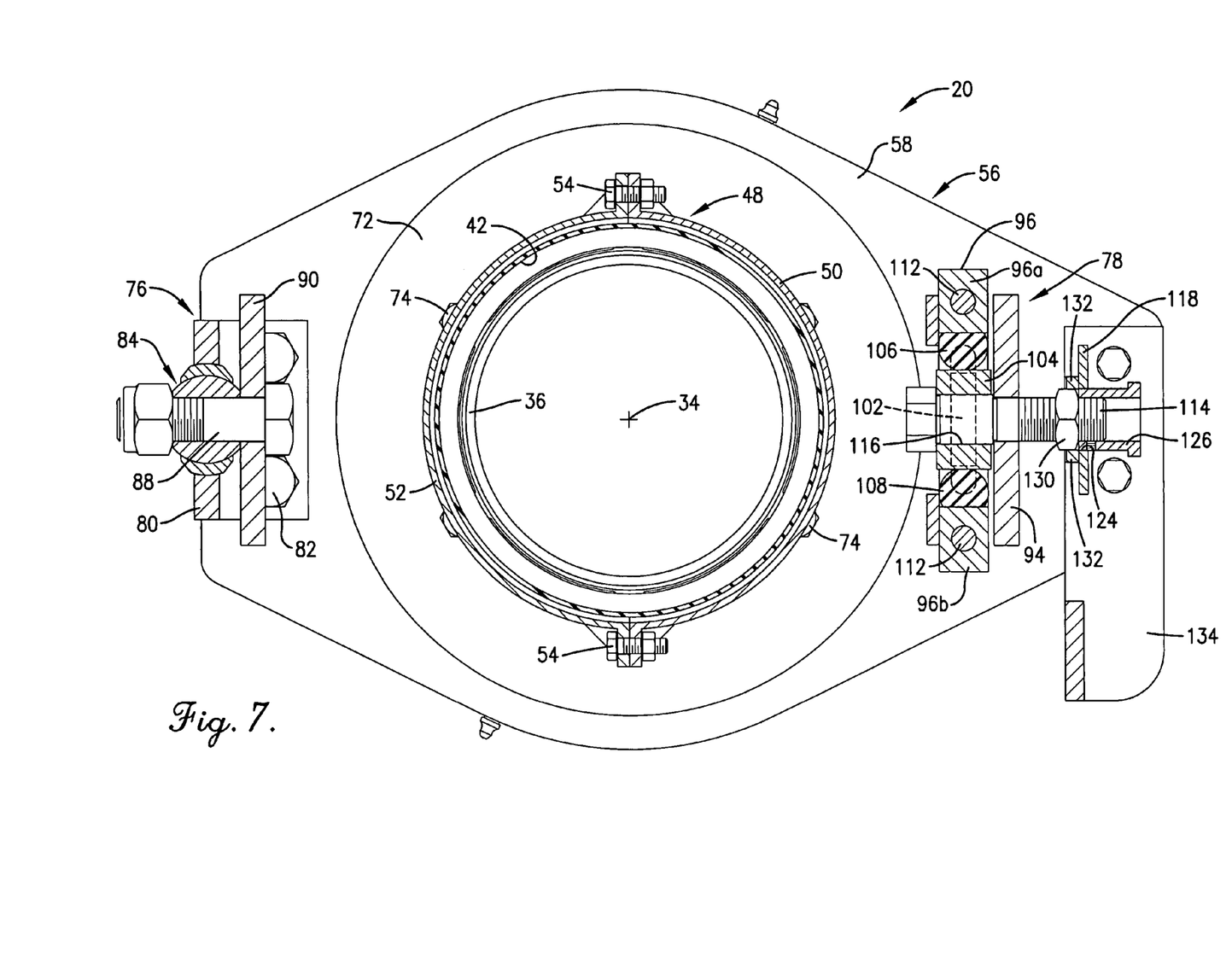
FIG. 7 is a horizontal cross sectional view through the joint taken substantially along line 7-7 of FIG. 6.

Turret 56 further includes a pair of diametrically opposed coupling assemblies 76 and 78 on opposite sides of joint axis 34 for use in attaching the inner end of corner span 18 to turret 56. Coupling assembly 76 includes an upright, generally L-shaped coupler bar 80 that is fastened at its lower end to base plate 58 by a plurality of bolts 82. A ball joint 84 near the upper end of coupler bar 80 includes a swiveling ball 86 that receives a horizontally disposed bolt 88 presenting a horizontal pivot axis. Bolt 88 connects the lower end of a downturned yoke arm 90 to the ball 86, the arm 90 being affixed at its upper end to the inner end of corner span 18 and comprising one arm of a coupling yoke broadly denoted by the numeral 92. Yoke 92 also includes a second downturned arm 94 projecting outwardly and downwardly from the opposite side of corner span 18 and connected to turret 56 by coupler assembly 78.

Coupler 78 assembly includes an upstanding bar 96 directly opposite bar 80 of coupling assembly 76. Bar 96 is fixed to base plate 58 and comprises a stationary component of coupling assembly 78. The upper end of bar 96 is notched as illustrated best in FIG. 4, presenting a relatively large, upwardly opening notch 98. Bar 96 has a horizontally extending groove 100 therein at the bottom of notch 98 that receives and retains a short guide rod 102 upon which a block 104 rests. Block 10 comprises a movable component of coupling assembly 78 and is slidable along guide rod 102. Because notch 98 is wider than block 104, a space is created on opposite sides of block 104 between the latter and upright shoulders 96a and 96b defined on bar 96 by notch 98. Within such spaces, a pair of resilient cushions 106 and 108 are disposed to effectively center block 104 on guide rod 102. Cushions 106 and 108, although compressible, are fairly hard. In one preferred embodiment, cushions 104 and 108 are constructed from UT35 Urethane having a durometer hardness of 83 Shore A. Preferably, each cushion 106, 108 can be compressed on the order of 0.270 inches by block 104. Thus, the total displacement available for block 104 along guide rod 102 is on the order of slightly more than one-half inch. A horizontal hold down bar 110 spans shoulders 96a, 96b in covering relationship to block 104 and cushions 106, 108 to keep those components in place. Bolts 112 secure hold down bar 110 to shoulders 96a, 96b of bar 96.

The downturned arm 94 of yoke 92 is connected to movable block 104 by a horizontally extending bolt 114 that is normally axially aligned with bolt 88 associated with balljoint 84 such that, collectively, bolts 88 and 114 serve to define a horizontal axis for up and down swinging movement of corner span 18 relative to turret 56 and main pipeline section 14. Bolt 114 passes through a hole 116 in block 104.

The outer end of bolt 114 is operably coupled with structure for use in performing a control function, such structure in a preferred embodiment taking the form of an upright displacement or operating arm 118. At its lower end, arm 118 is pivotally attached to bar 96 by a pivot bolt 120 and a bushing 122 so that arm 118 is adapted to swing about a horizontal axis defined by pivot bolt 120.

Bolt 114 passes through a hole 124 in displacement arm 118 a short distance above pivot bolt 120, and a bushing 126 fixed to the threaded end of bolt 114 by a set screw 128 fits within hole 124 to serve as a wear surface between bolt 114 and hole 124. A jam nut 130 positioned on the inboard side of displacement arm 118 bears against the inside edge of bushing 126 to assist in drivingly coupling the bolt 114 with displacement arm 118. A pair of laterally spaced, upright ribs 132 (FIGS. 6 and 7) on the inboard side of displacement arm 118 receive jam nut 130 therebetween and preclude accidental loosening thereof.

The upper end of displacement arm 118 is operably connected to a generally horizontally extending operating linkage 132 that is operably coupled with the shaft of a potentiometer (not shown) or other electrical control mechanisms housed within a protective control box 132 that is supported on an upright bracket 134 fixed to base plate 58 of turret 56. The control mechanism within box 132 may take a variety of forms well understood by those skilled in the art and preferably include means for controlling drive motors 32 of corner span 18. Preferably, drive motors 32 are variable speed, continuously driven drive motors such that the control mechanism within control box 132 speeds up or slows down drive motors 32 in response to displacing movement by displacement arm 118. On the other hand, if drive motors 32 are not the variable speed type, such control mechanism may be used to actuate and deactuate the motors as need be to maintain the proper position of corner span 18 relative to main pipeline section 14. The control mechanism within control box 132 may also include safety switching which completely shuts down all drive motors of the irrigation system 10 in the event of more than a certain predetermined displacement of arm 118 such as might arise if corner span 18 encounters an obstacle in the field or otherwise is about to suffer catastrophic circumstances.

Operation

The center pivot irrigation system 10 swings through the field in the usual manner, propelled by the various drive motors associated with the towers 24 of the main pipeline section 14 and the tower 28 of the corner span 18. The corner span 18 remains folded-in relative to the main pipeline section 14 until a corner is approached, at which time the drive motors 32 of corner span 18 are speeded up and steered in a manner to follow the predetermined path for corner travel established by appropriate means such as a buried cable or other system. As corner span 18 speeds up relative to main section 14, corner span 18 is free to swing out about vertical axis 34 at joint 20. During such travel, if corner span 18 lags behind main section 14 or moves ahead of its prescribed relative position, corner span 18 will be displaced a small amount relative to main section 14 about an upright axis through ball joint 84 of coupling assembly 76. While cushions 106 and 108 normally hold block 104 and thus corner span 18 against such displacement, if the force exerted by corner span 18 through block 104 against cushion 106 or 108 exceeds the level needed to compress such cushions, block 104 will move along guide rod 102 by a corresponding amount. Such movement is transferred to displacement arm 118, which in turn manipulates the electrical controls within box 132 in the appropriate manner. The result is that drive motors 32 of corner span 18 are either speeded up or slowed down until such time as the equilibrium condition between block 104 and cushions 106, 108 is re-established. A similar action occurs as the corner span 18 swings back in at the opposite side of the corner.

It will be noted that although the displacement of block 104 is technically movement along an arcuate path of travel having its upright axis at ball joint 84, such movement is so small that it may be considered generally linear in nature with the result that guide rod 102 may be straight, and, likewise, the concavity in the underside of block 104 may be configured to properly receive a straight guide rod 102. It will also be noted that the herein described arrangement for accommodating generally linear displacement of corner span 18 does not interfere in any way with the full functioning of joint 20 in its intended manner. The flow-through nature of joint 20 is in no way comprised or impaired, turret 56 is fully capable of swiveling as need be about joint axis 34 to accommodate a full range of swinging travel of corner span 18, and corner span 18 can rock up and down to accommodate terrain undulations due to the water-tight seal provided by flexible boot 42 and split coupler 48.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In an irrigation pipeline system having a generally horizontally extending main span and a generally horizontally extending swing span, an improved flow-through joint coupling the swing span with the main span for generally horizontal swinging movement of the swing span about a generally upright axis relative to the main span, said joint comprising:
    an upright tubular outlet port on the main span presenting said upright axis;
    a turret mounted on said main span for rotation about said upright axis with the swing span during said horizontal swinging movement of the swing span; and
    an upright tubular inlet port on the swing span aligned axially with said outlet port in fluid flow communication therewith,
    said swing span being attached to said turret in a manner to permit a limited amount of generally linear displacement of the swing span relative to the turret in a direction generally lengthwise of the swing span,
    said swing span being attached to said turret by a pair of coupling assemblies on opposite sides of said upright axis,
    at least one of said coupling assemblies including a first component fixed to the turret and a second component movable with the swing span relative to the first component during said displacement of the swing span.

2. In an irrigation pipeline system as claimed in claim 1, further comprising resilient structure operably coupled with said second component to yieldably resist said displacement of the swing span.

3. In an irrigation pipeline system as claimed in claim 1, further comprising a displacement arm operably coupled with said second component for operation thereby during displacement of the swing span for performing a control function.

4. In an irrigation pipeline system as claimed in claim 1, said first component including a guide,
said second component being movable along said guide.

5. In an irrigation pipeline system as claimed in claim 4, said guide comprising a slide rod,
said second component being slidable along said rod.

6. In an irrigation pipeline system as claimed in claim 5, further comprising a pair of resilient stops engaging said second component on opposite sides thereof for yieldably resisting movement of the second component along said slide rod.

7. In an irrigation pipeline system having a generally horizontally extending main span and a generally horizontally extending swing span, an improved flow-through joint coupling the swing span with the main span for generally horizontal swinging movement of the swing span about a generally upright axis relative to the main span, said joint comprising:
    an upright tubular outlet port on the main span presenting said upright axis;
    a turret mounted on said main span for rotation about said upright axis with the swing span during said horizontal swinging movement of the swing span; and
    an upright tubular inlet port on the swing span aligned axially with said outlet port in fluid flow communication therewith,
    said swing span being attached to said turret in a manner to permit a limited amount of generally linear displacement of the swing span relative to the turret in a direction generally lengthwise of the swing span,
    said swing span being attached to said turret by a pair of coupling assemblies on opposite sides of said upright axis,
    one of said coupling assemblies including a first component fixed to the turret and a second component movable with the swing span relative to the first component during said displacement of the swing span,
    the other of said coupling assemblies including a pivot defining a second upright axis,
    said swing span being pivotal about said second upright axis during displacement of the swing span.

8. In an irrigation pipeline system as claimed in claim 7,
said pivot and said one coupling assembly also permitting the swing span to swing up and down relative to the main span about a generally horizontal axis.

9. In an irrigation pipeline system as claimed in claim 8,
said pivot comprising a ball joint.

10. In an irrigation pipeline system as claimed in claim 9,
said second component including a horizontal pivot cooperating and aligned with said ball joint to define said generally horizontal axis for up and down movement of the swing span.

* * * * *